United States Patent [19]

Drain

[11] Patent Number: 4,693,443

[45] Date of Patent: Sep. 15, 1987

[54] APPARATUS FOR REMOVEABLY RETAINING SHEET MATERIAL

[75] Inventor: James M. Drain, Tucson, Ariz.

[73] Assignee: D. L. West Manufacturing, Inc., Tucson, Ariz.

[21] Appl. No.: 703,293

[22] Filed: Feb. 20, 1985

[51] Int. Cl.⁴ ............................................... A47F 7/00
[52] U.S. Cl. .............................. 248/447.1; 248/289.1; 248/316.3; 24/488; 24/67 R; 211/89
[58] Field of Search .................. 248/442.2, 447, 447.1, 248/452, 225.1, 231.3, 289.1, 257.2, 298, 316.2, 316.3; 40/361; 24/488, 67 R, 136 A; 211/45, 94, 89

[56] References Cited

U.S. PATENT DOCUMENTS

| | | | |
|---|---|---|---|
| 446,486 | 2/1891 | Van Benthuysen | 211/45 |
| 666,674 | 1/1901 | Hoffman | 248/289.1 |
| 1,417,009 | 5/1922 | Woodward | 248/316.3 |
| 1,944,304 | 1/1934 | Scarnegie | 211/89 |
| 2,486,279 | 10/1949 | Hathaway | 248/289.1 |
| 2,568,962 | 9/1951 | Lindahl | 248/289.1 |
| 2,590,297 | 3/1952 | Curtis | 211/89 |
| 3,106,376 | 10/1963 | Scott | 248/447.2 |
| 3,159,281 | 12/1964 | Hutter | 211/89 |
| 3,168,954 | 2/1965 | Herrmann | 211/89 |
| 3,298,647 | 1/1967 | Shepard | 211/89 |
| 3,399,429 | 9/1968 | Goodman | 248/467 |
| 3,591,013 | 7/1971 | Von Herrman | 211/89 |
| 3,675,782 | 7/1972 | Dudley | 211/89 |
| 4,085,848 | 4/1978 | Tsuge | 211/45 |
| 4,094,415 | 6/1978 | Larson | 211/94 |
| 4,515,277 | 5/1985 | Leth-Sorensen | 211/89 |

FOREIGN PATENT DOCUMENTS

| | | | |
|---|---|---|---|
| 658961 | 1/1965 | Belgium | 24/67 R |
| 491967 | 4/1953 | Canada | 211/89 |
| 2103269 | 2/1983 | United Kingdom | 24/488 |

Primary Examiner—J. Franklin Foss
Assistant Examiner—Robert A. Olson
Attorney, Agent, or Firm—Cahill, Sutton & Thomas

[57] ABSTRACT

A holder for sheet material frictionally secures the sheet material intermediate a back plate and a plurality of rollers. A rigid planar plate in converging relationship to the back plate guides the rollers against the back plate to compress the sheet material against the back plate and frictionally retain the sheet material. On exertion upon the sheet material of a pulling force generally in the plane of the back plate, the compressive force will be increased and withdrawal of the sheet material will be prevented. A pulling force exerted upon the sheet material at a substantial angle with respect to the back plate will urge the rollers along the rigid planar plate away from the back plate resulting in removal of the compressive force and permitting release of the sheet material.

1 Claim, 8 Drawing Figures

APPARATUS FOR REMOVEABLY RETAINING SHEET MATERIAL

The present invention relates to temporary retention apparatus and, more particularly, to holders for temporarily retaining sheets, straps and the like.

Spring loaded clips of many types have been used for the purpose of frictionally gripping between jaws sheet-like materials. The gripping strength of such clips is primarily a function of the spring force in combination with the coefficient of friction between the gripping surfaces of the jaws and the material gripped. Since most such clips are intended to be manually opened, certain constraints on the force required of the associated operative spring are imposed. Hence, the parameters of the spring are dictated by considerations other than that of purely maximizing the gripping capability of the associated clip.

To increase the gripping strength of certain spring loaded clips, the jaw surfaces may be serrated or include hooks or other protrusions of various types. With any of such surface configurations, the retention capability of the clip is greatly increased but such surfaces may not be used when the material to be gripped may not be punctured or otherwise damaged.

Non-spring loaded clips for sheet material include devices described in the following U.S. Patents. U.S. Pat. No. 3,675,782 is directed to an elongated hanger housing having a pair of caging walls for caging a plurality of interconnected balls or rollers. U.S. Pat. No. 3,298,647 is directed to a plurality of spaced apart longitudinally positioned and axially retained balls intermediate opposing walls for gripping a segment of a bag. U.S. Pat. No. 3,168,954 describes a plurality of independent rollers disposed intermediate opposing walls for retaining sheet material, the release of which requires a substantial pull upon the material due to the angles of the force vectors resulting and thereby producing a high probability of tearing of the sheet material prior to release. U.S. Pat. No. 3,159,281 is directed to an annular slot having a necked portion for engaging a bulbous end of pliant sheet material. U.S. Pat. No. 1,417,009 is directed to a garment hanger having a manually releasable rod for effecting disengagement with the cuffs of a hung pair of pants. U.S. Pat. No. 3,399,429 describes a gravity operated roller for wedgingly engaging sheet material, the release of which must be effected by manually overcoming the force of gravity acting upon the roller. U.S. Pat. No. 2,590,297 is directed to a spring loaded camming device for retaining the cuffs of a pair of pants within a hanger. And, U.S. Pat. No. 1,944,304 is directed to a work piece holder having a plurality of recesses, each of which contains a ball serving as a wedge for retaining a work piece.

Generally, all of the known prior art devices related to the present invention have mechanisms or operative elements which impose a retention force upon the material retained which is predetermined and not a function of the force tending to withdraw or remove the retained element.

It is therefore a primary object of the present invention to provide apparatus for retaining sheet-like material with a retention force proportional to an imposed force tending to withdraw the retained element.

Another object of the present invention is to provide apparatus for removeably retaining a sheet-like element as a function of the direction of a pulling force imposed upon the element and tending to withdraw the element.

Yet another object of the present invention is to provide apparatus for lockingly retaining sheet-like materials and yet permit release thereof as a function of the direction of the force imposed to withdraw the element.

Still another object of the present invention is to provide a very rigid apparatus having rollers associated therewith for lockingly securing or releasing a retained sheet-like element.

A further object of the present invention is to provide a mounting structure for slidingly receiving and securing in place a holder for removably retained sheet-like material.

A yet further object of the present invention is to provide apparatus for releasably retaining sheet-like elements which may be of any length without affecting its retention and release capability.

A still further object of the present invention is to provide a plurality of rollers cooperating with a rigid back plate and a rigid converging planar plate which collectively provide a retention force for sheet-like elements disposed intermediate the rollers and the back plate as a function of the direction and magnitude of a withdrawing force imposed upon the sheet-like elements.

These and other objects of the present invention will become apparent to those skilled in the art as the description thereof proceeds.

The present invention may be described with greater specificity and clarity with reference to the following drawings,, in which:

FIG. 1 is a perspective view illustrating the present invention mounted upon a board or the like;

Figure 1:
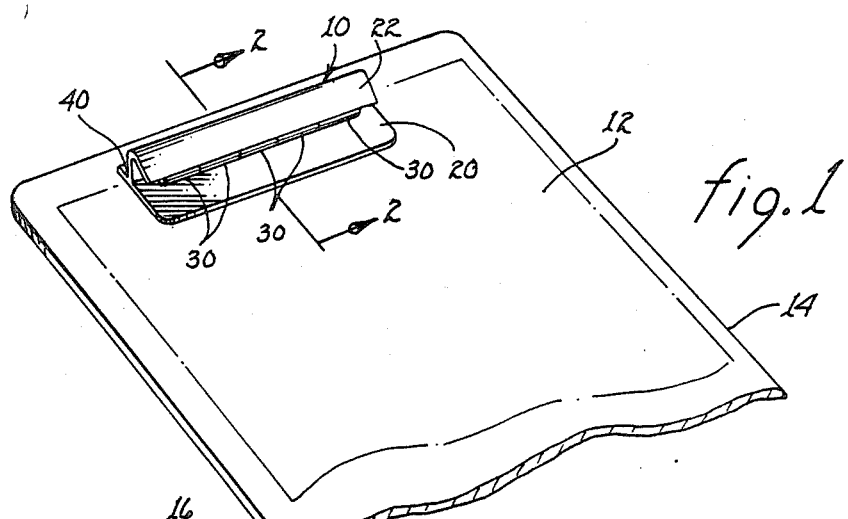

Referring to FIG. 1, there is shown a holder 10 for removeably retaining sheet-like elements, such as sheet of paper 12. The holder may be mounted or otherwise secured to a board 14 to provide a firm writing surface for the retained paper. Thus, the structure illustrated in FIG. 1 can function in the manner of a conventional clip board having a spring clip.

Figure 2:
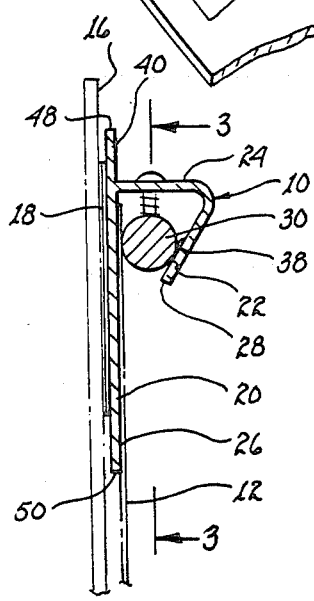
FIG. 2 is a cross-sectional view taken along lines 2—2, as shown in FIG. 1.

It is anticipated that the primary utility of the present invention will be in environments wherein holder 10 is permanently or removeably secured to a vertical surface to support depending sheet-like elements. This environment is illustrated in FIG. 2 wherein holder 10 is secured to a vertical surface 16 by means of tape 18 having an adhesive disposed on opposed sides. Thereby, holder 10 may be removeably adhered to surface 16.

Figure 3:
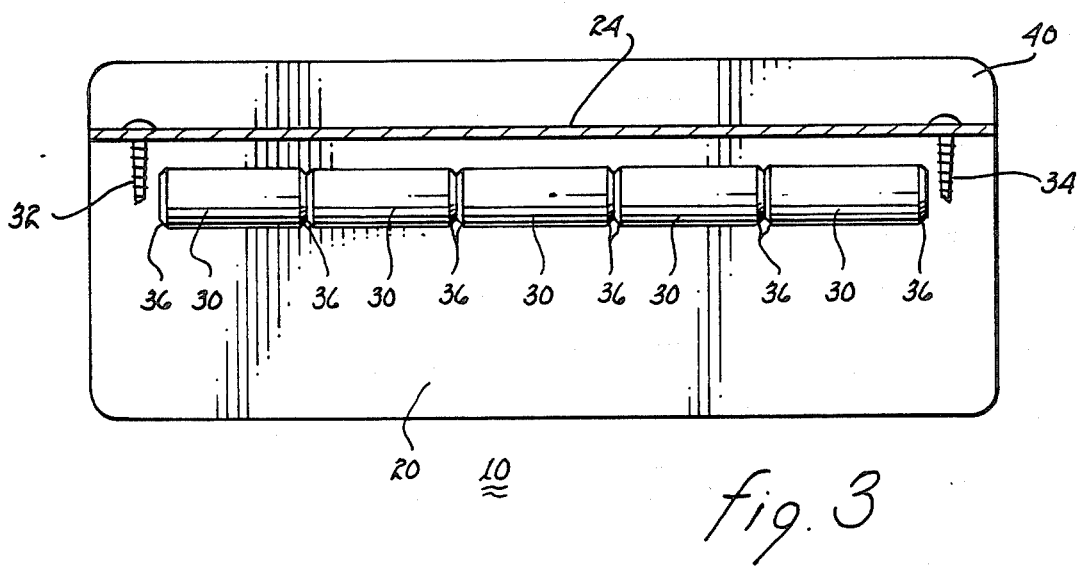
FIG. 3 is a cross-sectional view taken along lines 3—3, as shown in FIG. 2.

The structure and operation of holder 10 will be described with joint reference to FIGS. 1, 2 and 3. A back plate 20 of rigid material supports a rigid planar plate 22 through a flange 24. The planar plate converges from its junction with flange 24 toward surface 26 of plate 20 to terminal edge 28.

The retentive power of holder 10 is a function of the rigidity and lack of flex of back plate 20 and planar plate 22, individually and with respect to one another. To achieve such rigidity it has been found beneficial to develop holder 10 as an extrusion of an aluminum alloy. An alloy known in the trade by the designation T6063 has been found to produce a sufficiently rigid holder to provide satisfactory operation. It is anticipated that other materials or other alloys of aluminum may also be useable with satisfactory results. A secondary benefit of developing holder 10 as an extrusion is that of readily permitting manufacturing ease in producing holders of almost any length without significant manufacturing and assembly changes or modifications. These benefits will be readily apparent to those skilled in the manufacturing arts.

A plurality of rollers are located within the space defined collectively by back plate 20, flange 24 and planar plate 22. These rollers may be interconnected with a common shaft or by a peg extending into each of adjacent ones of the rollers; however, such interconnection has not been found necessary. The plurality of rollers are longitudinally retained in place by sheet metal screws 32, 34, or the like, extending through flange 24 at opposed ends of the plurality of rollers. Preferably, the displacement between screws 32, 34 is maintained greater than the combined length of the rollers to permit a limited degree of longitudinally oriented movement of the rollers without interference with the screws. Terminal edge 28 of planar plate 22 is located a distance from surface 26 less than the diameter of rollers 30 to prevent lateral movement of the rollers therebetween.

From the above description in combination with the illustrations in the drawings, it may be appreciated that rollers 30 are relatively loosely maintained within holder 10 and have a certain degree of independent lateral longitudinal and rotational movement. Because of such capability for movement and to prevent binding interference between the rollers, it is preferable that the circumferential edges be chamfered, as depicted by chamfers 36.

The capability of holder 10 for retaining a sheet-like element, such as paper 12 will be described with particular reference to FIG. 2. With holder 10 being mounted upon a vertical surface 16 gravity will tend to draw each of plurality of rollers 30 downwardly until further movement is precluded by contact with each of surface 26 of back plate 20 and surface 38 of planar plate 22; necessarily, such contact is tangential contact extending longitudinally along the rollers. Upon insertion of sheet 12 intermediate plurality of rollers 30 and surface 26, the rollers will be urged to rotate clockwise, which rotation, acting upon surface 38, will tend to cause the plurality of rollers to roll laterally slightly. The slight lateral movement of the plurality of rollers will produce upward and lateral movement of the plurality of rollers away from back plate 20 since planar plate 22 is not parallel with the back plate. It is to be understood that the upward and lateral movement of plurality of rollers 30 is essentially limited by and a function of the thickness of paper 12 such that the plurality of rollers are essentially continuously in contact with surface 38 and the surface of the paper.

Any downward pull of paper 20, which pulling force is essentially in the plane of back plate 20, will tend to exert a counterclockwise rotational movement upon the plurality of rollers. Such counterclockwise rotation of the plurality of rollers will tend to cause the rollers to translate along surface 38 toward terminal edge 26. The resulting lateral movement of the plurality of rollers toward back plate 20 will create a compressive force upon paper 12. Such compressive force is essentially transmitted along a very limited surface area due to the tangential nature of the contact between the plurality of rollers and the paper with the resulting effect that the friction force between the paper and surface 26 commensurate with the area of contact between the plurality of rollers and the paper is very great. Because back plate 20, flange 24 and planar plate 22 are essentially rigid and inflexible, flexing to any appreciable degree of any of these three elements essentially does not occur. Hence, there is essentially no dissipation or translation of the compressive force to bending or flexing of the components of holder 10. It will therefore be appreciated that the greater the pulling force upon paper 12 generally in the plane of back plate 20 will produce a corresponding or proportional frictional force to retain the paper.

The operation of holder 10 attendant removal of a retained sheet like element will be described with primary reference to FIG. 4. To remove a sheet like element, such as paper 12, a pulling force is exerted thereon at an angle with respect to the plane of surface 26 of base plate 20. If the angle is of sufficient magnitude, the paper will exert a resulting force upon the plurality of rollers 30 at a point circumferentially counterclockwise of the commensurate point of tangency between the plurality of rollers and the back plate. The resultant force will tend to cause translation of plurality of rollers 30 along surface 38 away from terminal edge 28. The resulting lateral displacement of the plurality of rollers away from back plate 26 will immediately relieve the formerly imposed compressive force and paper 12 will be released and can be withdrawn. It may be noted that release of paper 12 is not a function of nor in any manner dependent flexing of any of the elements of holder 10.

Through experimentation it has been determined that excellent results are achieved with respect to maximum retention force and ease of release if the acute angle defined by an imaginary extension of surface 38 and surface 26 is 60°. The reason why this particular angle appears to provide better results than other angles is not presently completely understood and therefore no explanation thereof can be given without speculation. Moreover, in the presently preferred embodiment of holder 10, the diameter of the rollers is approximately ⅜ inches and the length of each roller is approximately 1 inch. With such roller diameter, it has been found that a roller length of less than ½ inch or more than 1½ inches provides less satisfactory results.

Figure 4:
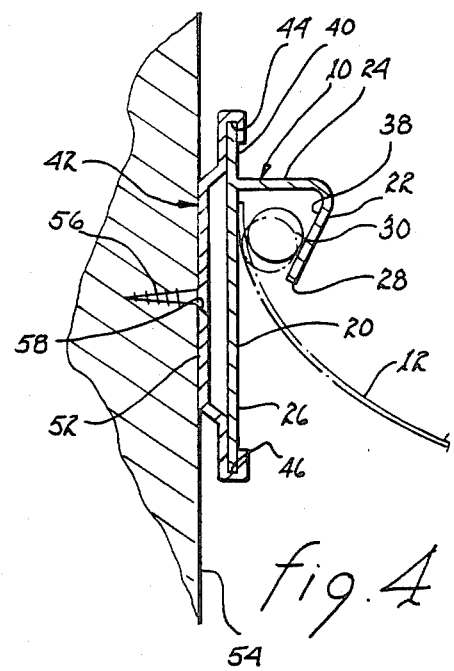
FIG. 4 illustrates a mounting for the present invention and the operative aspects attendant release of a retained sheet-like element.
Figure 5:
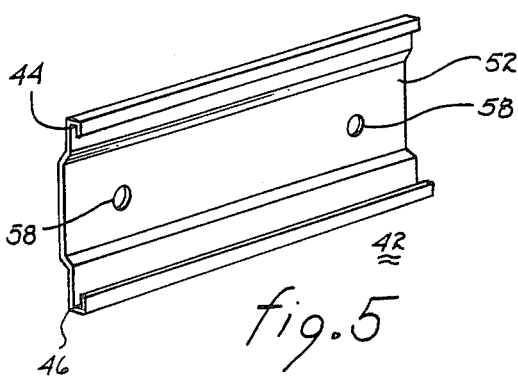
FIG. 5 is a perspective view of the mounting shown in FIG. 4.

Referring jointly to FIGS. 4 and 5, a mounting for holder 10 will be described. As is evident from the drawings, holder 10 may include an extension 40 of base plate 20 extending beyond flange 24. This extension is readily formed during extrusion of the holder. A mounting 42 includes a pair of opposed channels 44, 46 spaced apart from one another commensurate with the distance between edge 48 of extension 40 and edge 50 of back plate 26. Mounting 42 includes a center section 52, which center section may be laterally displaced out of the plane generally defined by channels 44, 46. This center section serves as the point of attachment of mounting 42 to a wall, cabinet side or other surface 54 intended for supporting holder 10. Attachment to surface 54 may be by means of wood screw 56 extending through apertures 58 in center section 52 or other appropriate securing means.

Figure 6:
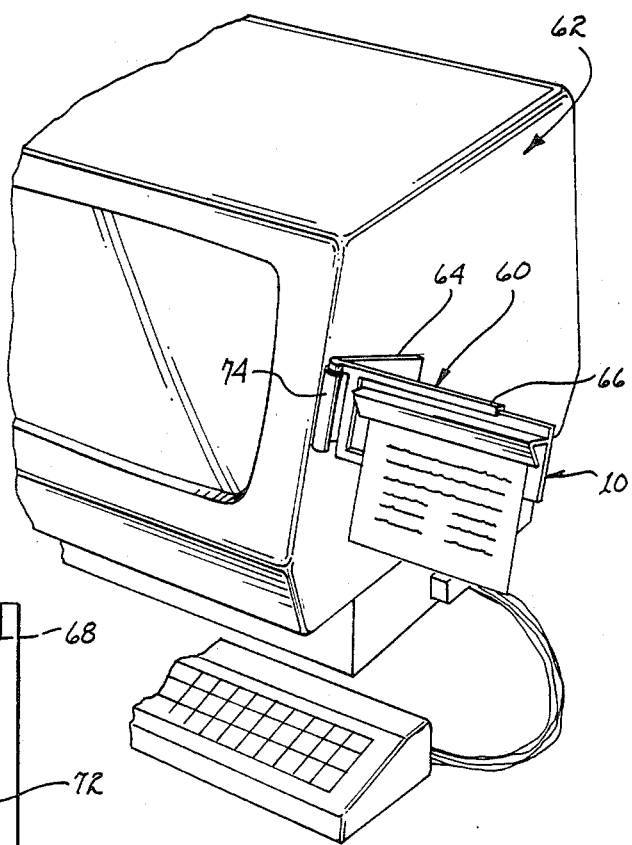
FIG. 6 illustrates a hinged mounting for retaining the invention.
Figure 8:
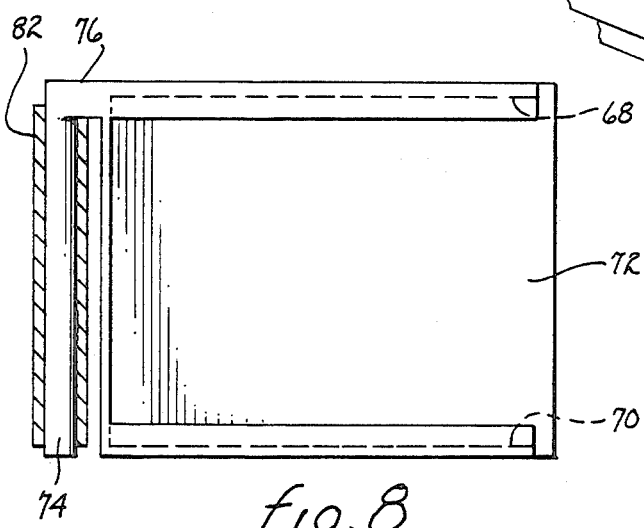
FIG. 8 is a partial cross-sectional view taken along lines 8—8, as shown in FIG. 7.
Figure 7:
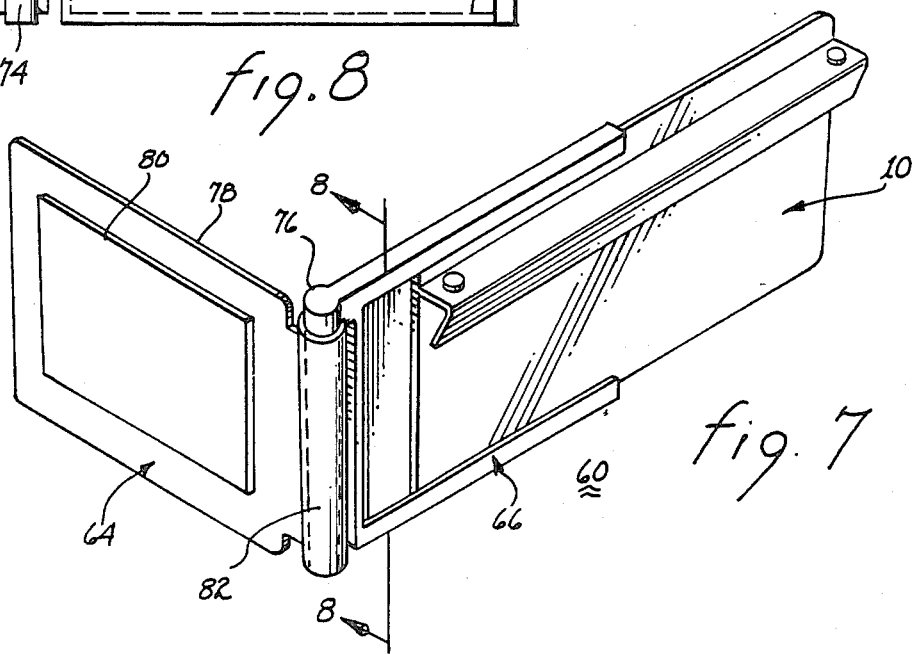
FIG. 7 is a perspective view of the hinged mounting shown in FIG. 6.

Personal computers are becoming more and more prevalent at business locations and in the home. Most of these computers require substantial table space for the components and little room is usually left for locating documents adjacent thereto and from which information is to be entered into the computer. Referring jointly to FIGS. 6, 7 and 8, there is illustrated a variant mounting 60 for holder 10 which is particularly adapted for use with a computer console 62.

Variant mounting 60 includes a mounting plate 64 for pivotally supporting a channeled member 66. The channeled member includes a pair of opposed channels 68, 70 supported by an interconnecting web member 72. The spacing between channels 68, 70 is commensurate with the distance between edges 48, 50 (see FIG. 2) of back plate 20 and extension 40. Thereby, holder 10 may be slidably inserted into channels 68, 70, as illustrated in FIG. 7. Channel member 66 includes a pin 74 depending from arm 76.

Mounting member 64 includes a mounting plate 78 for attaching variant mounting 60 to a surface, whether such surface be essentially vertical, as illustrated in FIG. 6, or otherwise. Means may also be included with mounting plate 78 to secure the mounting member in place; one such means may be a segment of tape 80 having an adhesive on opposed surfaces for adhering to both the mounting plate and the surface to which mounting member 64 is to be attached. At one end of the mounting plate, there is located a cylinder 82 sized to penetrably receive pin 74.

From the above description, it may be appreciated that variant mounting 60 may be detachably attached to a side of computer console 62 or other surface. Furthermore, the pivotal interconnection between mounting member 64 and channeled member 66 permits the channeled member to be pivotally positioned to present the sheet material retained by holder 10 at the most convenient and efficient angle for a user of the computer console. When the channeled member is not needed to support holder 10, it may be pivoted to a position adjacent the computer console and thereby out of the way of other activities. The sliding engagement/disengagement between holder 10 and channeled member 66 permits ready removal of the holder for other uses or substitution at the user's option.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. Apparatus for releasably securing sheet material, said apparatus comprising in combination:
    (a) a holder comprising:
        (1) means for providing support for the sheet material placed adjacent thereto, said support means including a pair of edges;
        (2) a plurality of generally longitudinally aligned rollers for exerting a compressive force against the sheet material placed intermediate said plurality of rollers and said support means to frictionally retain the sheet material with respect to said support means, each of said rollers including a chamfered circumferential edge for discouraging binding interference with adjacent rollers;
        (3) means for guiding said plurality of rollers toward and away from said support means in response to the angle with respect to said support means of a pull in force exerted upon the sheet material to increase and decrease, respectively, the friction force retaining the sheet material adjacent said support means; and
        (4) planar means extending perpendicularly from said support means for interconnecting said support means with said guiding means;
    (b) a mounting for said holder, said mounting comprising:
        (1) means for disengageably engaging said support means, said engaging means comprising a pair of opposed channels for receiving said pair of edges;
        (2) means for securing said mounting to a surface and;
        (3) means for pivotally interconnecting said engaging means with said securing means.

* * * * *